United States Patent
Jung et al.

(10) Patent No.: US 11,579,962 B2
(45) Date of Patent: Feb. 14, 2023

(54) COMPUTING SYSTEM AND METHOD FOR AUTOMATED PROGRAM ERROR REPAIR

(71) Applicant: KOREA ELECTRONICS TECHNOLOGY INSTITUTE, Seongnam-si (KR)

(72) Inventors: Minyoung Jung, Goyang-si (KR); Saim Shin, Seoul (KR); Jinyea Jang, Suwon-si (KR); Hyeontae Seo, Anyang-si (KR)

(73) Assignee: KOREA ELECTRONICS TECHNOLOGY INSTITUTE, Seongnam-Si (KR)

( * ) Notice: Subject to any disclaimer, the term of this patent is extended or adjusted under 35 U.S.C. 154(b) by 0 days.

(21) Appl. No.: 17/349,548

(22) Filed: Jun. 16, 2021

(65) Prior Publication Data
US 2022/0179731 A1     Jun. 9, 2022

(30) Foreign Application Priority Data
Dec. 7, 2020     (KR) ........................ 10-2020-0169281

(51) Int. Cl.
*G06F 11/00*     (2006.01)
*G06F 11/07*     (2006.01)
(Continued)

(52) U.S. Cl.
CPC ............ *G06F 11/0793* (2013.01); *G06F 8/44* (2013.01); *G06F 11/0706* (2013.01);
(Continued)

(58) Field of Classification Search
CPC ............ G06F 11/0793; G06F 11/0706; G06F 11/0751; G06F 11/079; G06F 8/44; G06F 3/04; G06F 3/08
(Continued)

(56) References Cited

U.S. PATENT DOCUMENTS

| | | | |
|---|---|---|---|
| 2007/0168746 A1* | 7/2007 | Righi | ................ G06F 11/3656 714/38.11 |
| 2011/0154503 A1* | 6/2011 | Stewart | ................ G06F 21/14 726/26 |

(Continued)

FOREIGN PATENT DOCUMENTS

| | | |
|---|---|---|
| JP | H09-185500 A | 7/1997 |
| KR | 10-2020-0071413 A | 6/2020 |

OTHER PUBLICATIONS

Office Action in Korean Application No. 10-2020-0169281 dated May 25, 2022 in 5 pages.
(Continued)

*Primary Examiner* — Sarai E Butler
(74) *Attorney, Agent, or Firm* — Knobbe, Martens, Olson & Bear, LLP

(57) ABSTRACT

This application relates to a computing system and method for an automated program error repair. In one aspect, the computing system includes a storage, a preprocessing processor, and an automated error repair processor. The storage stores a program code. The preprocessing processor acquires the program code from the storage and preprocesses the program code. Preprocessing includes tokenizing the program code with tokens, converting the tokens into vectors, and adding location information for the tokens. The automated error repair processor receives the preprocessed program code as an input from the preprocessing processor, detects an error in the preprocessed program code, corrects the detected error, and outputs the error-corrected program code. Detecting and correcting the error are performed based on a deep learning result and the location information for the tokens.

7 Claims, 2 Drawing Sheets

(51) Int. Cl.
*G06N 3/04* (2023.01)
*G06N 3/08* (2023.01)
*G06F 11/36* (2006.01)
*G06F 8/41* (2018.01)

(52) U.S. Cl.
CPC ........ *G06F 11/079* (2013.01); *G06F 11/0751* (2013.01); *G06F 11/3624* (2013.01); *G06N 3/04* (2013.01); *G06N 3/08* (2013.01)

(58) Field of Classification Search
USPC .................................................... 714/1–57
See application file for complete search history.

(56) References Cited

U.S. PATENT DOCUMENTS

| | | | |
|---|---|---|---|
| 2014/0109067 A1* | 4/2014 | Flicker | G06F 8/427 |
| | | | 717/142 |
| 2015/0135166 A1 | 5/2015 | Tarlow et al. | |
| 2016/0103733 A1* | 4/2016 | Camp | G06F 11/1048 |
| | | | 714/6.11 |
| 2017/0115963 A1* | 4/2017 | Stewart | G06F 8/71 |
| 2017/0291295 A1* | 10/2017 | Gupta | B25J 9/0081 |
| 2017/0344459 A1* | 11/2017 | Horesh | G06F 11/3644 |
| 2018/0373986 A1* | 12/2018 | Rainwater | G06N 3/084 |

OTHER PUBLICATIONS

Gupta et al. "Deepfix: Fixing common C language errors by deep learning." Thirty-First AAAI Conference on Artificial Intelligence, Feb. 28, 2017, 7 pages.

\* cited by examiner

COMPUTING SYSTEM AND METHOD FOR AUTOMATED PROGRAM ERROR REPAIR

CROSS-REFERENCE TO RELATED APPLICATION

The present application claims priority to Korean Patent Application No. 10-2020-0169281 filed on Dec. 7, 2020 in the Korean Intellectual Property Office, which is incorporated herein in its entirety by reference.

BACKGROUND

Technical Field

The present disclosure generally relates to an automated program error repair. In particular, the present disclosure relates to a computing system and method for automatically correcting an error occurring in a program compilation process or a logical error that cannot be found in the compilation process.

Description of Related Technology

Compiler technologies for checking various types of errors in a source code of a program have been known in the art. The compiler is used as a tool of generating an object code when there are no errors by lexical, syntactic, and semantic checks of the current language. A typical program error checking method analyzes a vocabulary, analyzes a syntax, analyzes the meaning, thereby generates an intermediate code, and then optimizes the code to generate an object code.

SUMMARY

The present disclosure provides a computing system and method for correcting a program error at an exact location in a program code, based on location information of the program code, and supporting an automated program error repair that does not require user intervention.

According to embodiments of the present disclosure, a computing system for an automated program error repair may include a storage storing a program code; a preprocessing system acquiring the program code from the storage and preprocessing the program code, wherein preprocessing includes tokenizing the program code with tokens, converting the tokens into vectors, and adding location information for the tokens; and an automated error repair system receiving the preprocessed program code as an input from the preprocessing system, detecting an error in the preprocessed program code, correcting the detected error, and outputting the error-corrected program code, wherein detecting and correcting the error are performed based on a deep learning result and the location information for the tokens.

The preprocessing system may include a token processor configured to acquire the program code from the storage, to decompose the program code into lexemes as the tokens, and to add lexeme types as additional information for the tokens; a vector converter configured to convert the tokens generated by the token processor into vectors in a form of numbers understandable to a computer; and a location information encoder configured to identify a location of each lexeme in the program code and to add the identified locations as the location information for the tokens.

The automated error repair system may be configured to perform, using a deep learning algorithm based on an artificial neural network, learning on data provided by the preprocessing system, to understand the data through such learning, to, based on understanding of the data, detect the error in the preprocessed program code provided by the preprocessing system, and to correct the detected errors.

The automated error repair system may output the error-corrected program code to the storage and/or a display.

According to embodiments of the present disclosure, a method for an automated program error repair implemented by a computing system may include acquiring a program code; preprocessing the program code, wherein preprocessing includes tokenizing the program code with tokens, converting the tokens into vectors, and adding location information for the tokens; detecting an error in the preprocessed program code; correcting the detected error; and outputting the error-corrected program code, wherein detecting and correcting the error are performed based on a deep learning result and the location information for the tokens.

In the method, the preprocessing may include decomposing the program code into lexemes as the tokens; adding lexeme types as additional information for the tokens; converting the tokens into vectors in a form of numbers understandable to a computer; identifying a location of each lexeme in the program code; and adding the identified locations as the location information for the tokens.

The method may further include performing, using a deep learning algorithm based on an artificial neural network, learning on preprocessed data; and understanding the preprocessed data through such learning, wherein detecting and correcting the error in the preprocessed program code is performed based on understanding of the preprocessed data.

In the method, the error-corrected program code may be outputted to a storage and/or a display.

DETAILED DESCRIPTION

A typical program error checking method can only check some errors as to whether the source code is written correctly, and there is a problem that it cannot check errors in the program, such as logical errors, which are difficult to be checked on the basis of rules. In other words, the existing compiler, which operates based on rules to correct program errors, checks some errors such as omissions in variable declarations or typos, but there is a problem that such errors cannot be automatically corrected and also logical errors cannot be found.

Hereinafter, an embodiment of the present disclosure will be described in detail with reference to the accompanying drawings. The present disclosure may, however, be embodied in many different forms and should not be construed as being limited to the embodiment set forth herein. Rather, this embodiment is provided so that the disclosure will be thorough and complete and will fully convey the scope of the disclosure to those skilled in the art. Accordingly, an embodiment described herein should be understood to include various modifications, equivalents, and/or alternatives.

In addition, techniques that are well known in the art and not directly related to the present disclosure are not described herein. This is to clearly convey the subject matter of the present disclosure by omitting an unnecessary explanation. Also, the terms are merely used for describing a particular embodiment but do not limit the embodiment. Singular forms are intended to include plural forms unless the context clearly indicates otherwise.

Figure 1:
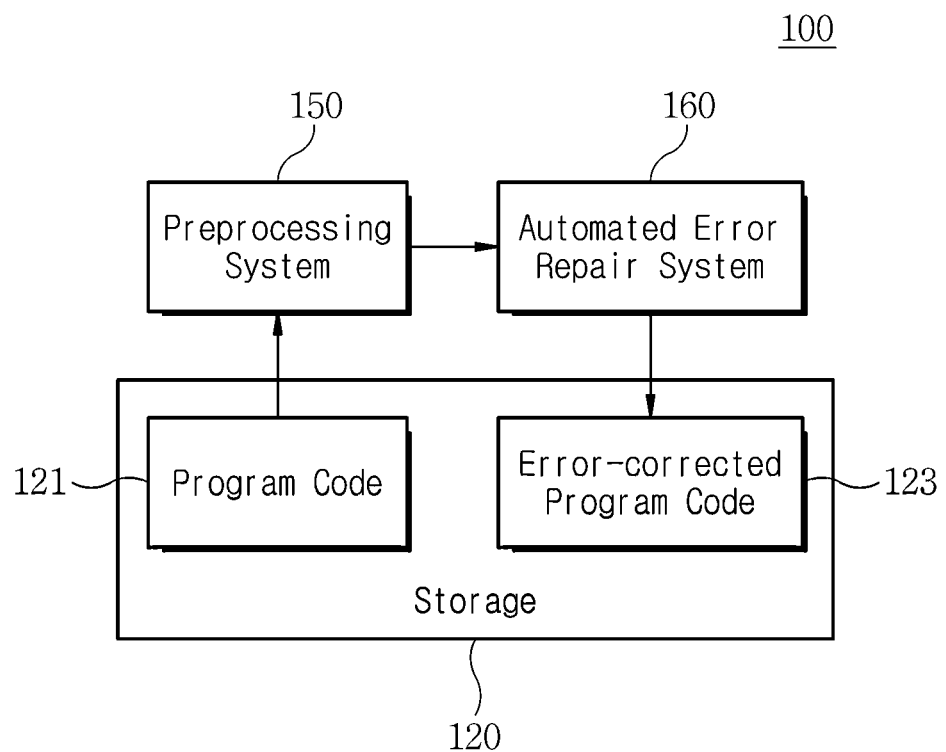
FIG. 1 is a block diagram illustrating a computing system for an automated program error repair according to an embodiment of the present disclosure.

FIG. 1 is a block diagram illustrating a computing system for an automated program error repair according to an embodiment of the present disclosure.

Referring to FIG. 1, the computing system 100 according to an embodiment includes a storage 120, a preprocessing system 150 (also referred to as a preprocessor or a preprocessing processor), and an automated error repair system 160 (also referred to as an automated error repair apparatus, device, or processor). When one or more errors exist in a program source code, the computing system 100 can find and correct such errors and then provide an error-corrected code. The computing system 100 may be configured based on at least one computing device. For example, the computing system 100 may be composed of a computing device including at least one processor and at least one storage, and the at least one processor may perform operations of the preprocessing system 150 and the automated error repair system 160. Alternatively, the computing system 100 may be configured based on a plurality of computing devices. For example, the computing system 100 may include a computing device for performing the operation of the preprocessing system 150, a computing device for performing the operation of the automated error repair system 160, and a computing device for performing the function of the storage 120. Alternatively, the computing system 100 may be configured in a state where a plurality of computing devices are connected through a network. For example, the computing system 100 may include a server device for performing the operation of the preprocessing system 150, a server device for performing the operation of the automated error repair system 160, and a server device for performing the function of the storage 120. In this case, the server devices may be connected through a wired network and/or a wireless network.

The storage 120 generally stores at least one program and data required to operate the computing system 100. The storage 120 may be configured to have a plurality of memory regions or a plurality of memory devices. For example, the storage 120 may store software modules capable of supporting a tokenization function, a vector conversion function, and a location information encoding function in the preprocessing system 150, and may provide the software modules under the control of at least one processor. In addition, the storage 120 stores an algorithm for performing deep learning capable of supporting an error correction function based on an artificial neural network in the automated error repair system 160. In addition, the storage 120 may temporarily store data for learning the deep learning algorithm based on the artificial neural network. Particularly, in relation to an embodiment of the present disclosure, the storage 120 may store a program code 121 to be error-corrected, and an error-corrected program code 123. In this case, the storage 120 may include a memory region for storing the program code 121 to be provided to the preprocessing system 150, and a memory region for storing the error-corrected program code 123 outputted from the automated error repair system 160. Alternatively, the storage 120 may include a memory device that stores the program code 121, and a memory device that stores the error-corrected program code 123.

The preprocessing system 150 performs preprocessing of the program code 121 such that, when the program code 121 stored in the storage 120 is provided to the automated error repair system 160, the automated error repair system 160 understands the sequence of the program code 121 and outputs the error-corrected program code 123. That is, the preprocessing system 150 is capable of converting the program code 121 into a form allowing the automated error repair system 160 to learn and derive a result. In this regard, the preprocessing system 150 may include a configuration as shown in FIG. 2, which will be described below.

The automated error repair system 160 performs, using a deep learning algorithm based on an artificial neural network, learning on data provided by the preprocessing system 150, and understands the data through such learning. Based on understanding of the data, the automated error repair system 160 detects errors in the program code 121 provided by the preprocessing system 150 and automatically correct the detected errors. In this regard, the automated error repair system 160 performs in advance various learning on the program code 121 written in a specific language (e.g., C/C++ programming language), and thereby detects errors that occur in the compilation process of the program code 121 and/or errors that may occur during the execution of the program code 121. In addition, the automated error repair system 160 may automatically correct the detected errors in the program code 121, based on the learning result, and output the error-corrected program code 123. In addition, the automated error repair system 160 may know the location of the error occurrence, based on location information of the program code 121 provided by the preprocessing system 150. Because of knowing the error occurrence location, the automated error repair system 160 may output to the storage 120 the error-corrected program code 123 in which all error codes are changed to restored codes. Additionally or alternatively, the automated error repair system 160 may output restored codes for errors on a display (not shown) along with error locations.

In order to enable the above-described operations, the automated error repair system 160 can understand the sequence of codes, detect errors in the sequence of codes, memorize the detected errors, and memorize recovered codes for the detected errors through deep learning based on artificial neural networks such as a recurrent neural network (RNN), a feedback neural network (FNN), and an Elman neural network (ENN).

Figure 2:
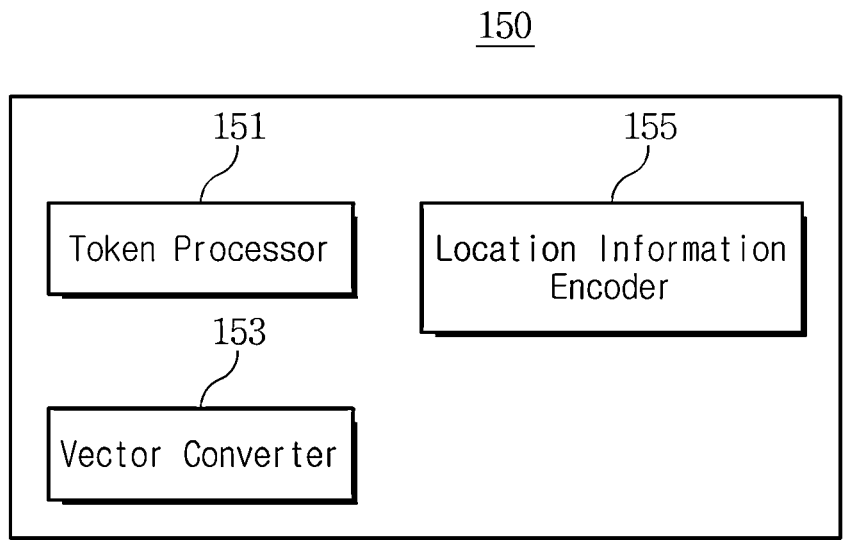
FIG. 2 is a block diagram illustrating a preprocessing system according to an embodiment of the present disclosure.

FIG. 2 is a block diagram illustrating a preprocessing system according to an embodiment of the present disclosure.

Referring to FIGS. 1 and 2, the preprocessing system 150 may include a token processor 151, a vector converter 153, and a location information encoder 155.

The token processor 151 tokenizes the program code 121 stored in the storage 120. Specifically, the token processor 151 acquires the program code 121 from the storage 120, analyzes the acquired program code 121, decomposes the program code 121 into lexemes as tokens, and adds lexeme types (e.g., a keyword, an identifier, an operator, etc.) as additional information for tokens.

The vector converter 153 converts the tokens generated by the token processor 151 into vectors in the form of numbers that a computer (i.e., the automated error repair system 160 itself or a computing device or processor equipped with the automated error repair system 160) can understand.

The location information encoder 155 performs location information encoding. Specifically, the location information encoder 155 identifies a location of each lexeme in the program code 121, and adds the identified locations as location information for tokens. In one embodiment, the location information encoder 155 may receive, from the vector converter 153, a sequence of lexemes generated as tokens by the token processor 151 and then converted into vectors by the vector converter 153, and identify a location of each lexeme. In another embodiment, the location information encoder 155 may receive, from the token processor 151, a sequence of lexemes generated as tokens by the token processor 151, and identify a location of each lexeme.

Preprocessed data, that is, the program code which is tokenized and vectorized and has location information, is provided as an input to the automated error repair system 160.

Figure 3:
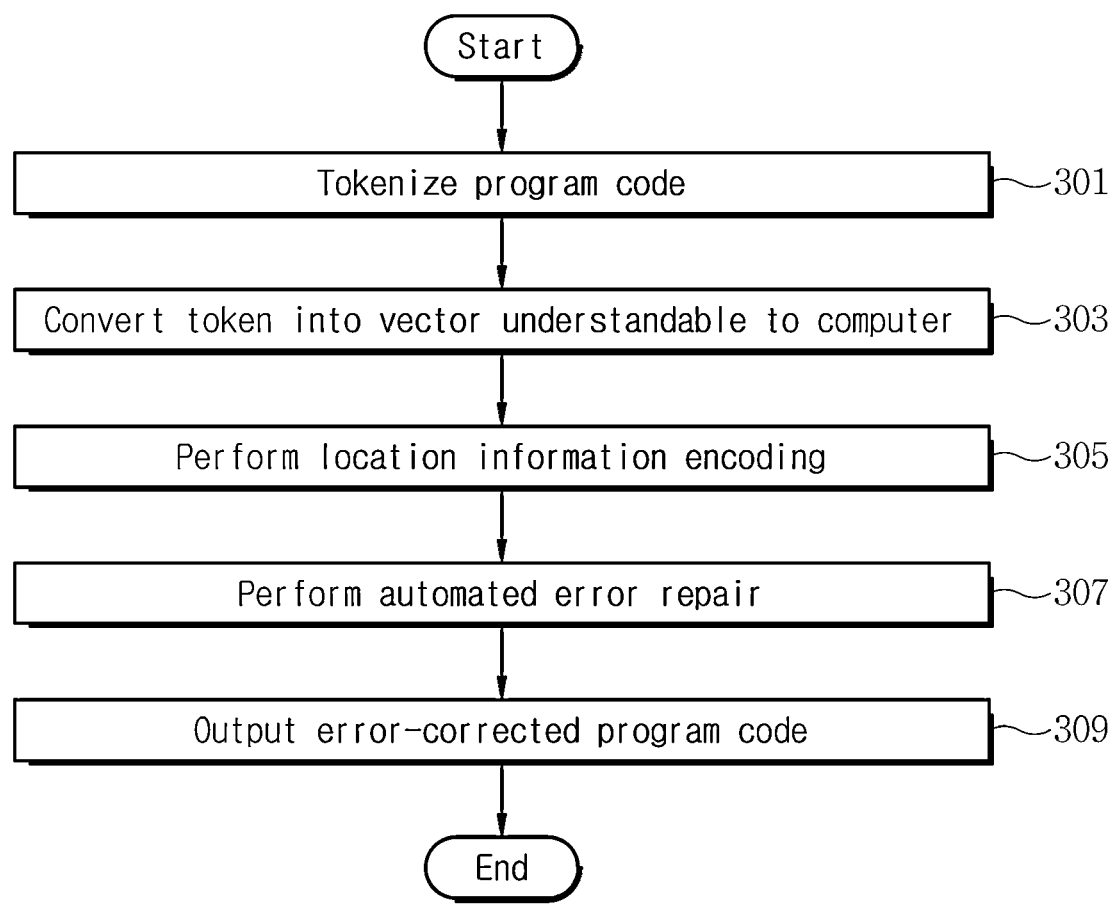
FIG. 3 is a flow diagram illustrating a method for an automated program error repair according to an embodiment of the present disclosure.

FIG. 3 is a flow diagram illustrating a method for an automated program error repair according to an embodiment of the present disclosure.

Referring to FIGS. 1 to 3, in order to learn to repair the program code 121, the computing system 100 should express the program code as a sequence. To this end, at step 301, the preprocessing system 150 (e.g., the token processor 151 therein) of the computing system 100 tokenizes the program code 121 with tokens. Specifically, the preprocessing system 150 of the computing system 100 acquires the program code 121 from the storage 120, decomposes the program code 121 into lexemes as tokens, and adds lexeme types (e.g., a keyword, an identifier, an operator, etc.) as additional information for tokens.

At step 303, the preprocessing system 150 (e.g., the vector converter 153 therein) of the computing system 100 converts the tokens generated at the step 301 into vectors in the form of numbers that a computer (i.e., the automated error repair system 160 itself or a computing device or processor equipped with the automated error repair system 160) can understand.

At step 305, the preprocessing system 150 (e.g., the location information encoder 155 therein) of the computing system 100 performs location information encoding. Specifically, the preprocessing system 150 of the computing system 100 identifies a location of each lexeme in the program code 121, and adds the identified locations as location information for tokens. The step 305 may be performed either after or before the step 303.

At step 307, the automated error repair system 160 of the computing system 100 performs automated error repair on preprocessed data. Specifically, the automated error repair system 160 receives the preprocessed data as an input from the preprocessing system 150. Then, the automated error repair system 160 reads and understands the entire code sequence contained in the preprocessed data through a deep learning algorithm based on an artificial neural network. Then, if at least one error is detected, the automated error repair system 160 automatically correct the detected error. To this end, the automated error repair system 160 (or any other cooperating processor) may drive the deep learning algorithm and learn in advance the program code 121. For example, the automated error repair system 160 may learn in advance a variable definition pattern of program codes, a role and purpose of functions, and an arrangement of codes used when an output for a specific purpose is required through the operation of variables and functions. In addition, based on an understanding of code grammars required for starting and outputting a program code, the automated error repair system 160 may detect and correct an incorrectly written grammar or an error of a variable or function.

At step 309, the automated error repair system 160 of the computing system 100 outputs the error-corrected program code 123, that is, the recovered program code. Because of knowing the error occurrence location as described above, the automated error repair system 160 may output to the storage 120 the error-corrected program code 123 in which all error codes are changed to restored codes. Additionally or alternatively, the automated error repair system 160 may output restored codes for errors on a display (not shown) along with error locations.

While the present disclosure has been particularly shown and described with reference to an exemplary embodiment thereof, it will be understood by those skilled in the art that various changes in form and details may be made therein without departing from the scope of the present disclosure as defined by the appended claims.

What is claimed is:

1. A computing system for an automated program error repair, the system comprising:
   a storage storing a program code written in a specific programming language;
   a preprocessing processor configured to acquire the program code from the storage and preprocess the program code by tokenizing the program code with tokens, converting the tokens into vectors, and adding location information for the tokens; and
   an automated error repair processor configured to:
      receive the tokenized program code as an input from the preprocessing processor,
      perform a deep learning on the tokenized program code,
      detect an error in a compilation or execution process of the program code,
      determine a location of an error occurrence based on the location information provided by the preprocessing processor,
      automatically correct the detected error in the program code, based on a result of the deep learning,
      output an error-corrected program code, to the storage, in which all error codes are changed to restored codes, and
      display the restored codes for errors on a display along with error locations.

2. The computing system of claim 1, wherein the preprocessing processor includes:
   a token processor configured to acquire the program code from the storage, to decompose the program code into lexemes as the tokens, and to add lexeme types as additional information for the tokens;
   a vector converter configured to convert the tokens generated by the token processor into vectors in a form of numbers understandable to a computer; and
   a location information encoder configured to identify a location of each lexeme in the program code and to add the identified locations as the location information for the tokens.

3. The computing system of claim 2, wherein the lexeme types comprise a keyword, an identifier, or an operator.

4. The computing system of claim 2, wherein the location information encoder is further configured to identify a location of each lexeme in the program code, and add identified locations as location information for the tokens.

5. The computing system of claim 1, wherein the automated error repair processor is further configured to:
understand a sequence of codes;
detect errors in the sequence of the codes;
memorize the detected errors; and
memorize recovered codes for the detected errors through the deep learning.

6. A method for an automated program error repair implemented by a computing system, the method comprising:
acquiring a program code written in a specific programming language from a storage of the computing system;
preprocessing the program code, at a preprocessing processor of the computing system, wherein the preprocessing includes tokenizing the program code with tokens, converting the tokens into vectors, and adding location information for the tokens;
performing a deep learning on the tokenized program code;
detecting, at an automated error repair processor of the computing system, an error in a compilation or execution process of the program code;
determining, at the automated error repair processor, a location of an error occurrence based on the location information provided by the preprocessing processor;
automatically correcting, at the automated error repair processor, the detected error in the program code, based on a result of the deep learning;
outputting, at the automated error repair processor, the error-corrected program code, to the storage, in which all error codes are changed to restored codes; and
displaying the restored codes for errors on a display along with error locations.

7. The method of claim 6, wherein the preprocessing includes:
decomposing the program code into lexemes as the tokens;
adding lexeme types as additional information for the tokens;
converting the tokens into vectors in a form of numbers understandable to a computer;
identifying a location of each lexeme in the program code; and
adding the identified locations as the location information for the tokens.

* * * * *